United States Patent [19]

Lee et al.

[11] Patent Number: 5,714,545
[45] Date of Patent: Feb. 3, 1998

[54] THERMOPLASTIC ELASTOMERIC COMPOSITION AND PROCESS FOR PREPARING THE SAME

[75] Inventors: Soon Jong Lee; Hae Won Lee; Dong Jin Chu; Kyu Jong Lee; Byung Hyung Lee, all of Yusung-ku, Rep. of Korea

[73] Assignee: Yukong Limited, Seoul, Rep. of Korea

[21] Appl. No.: 586,455

[22] Filed: Jan. 16, 1996

[30] Foreign Application Priority Data

Jul. 19, 1995 [KR] Rep. of Korea .................. 1995-21732

[51] Int. Cl.$^6$ ............................. C08L 23/26; C08L 23/16; C08L 9/00
[52] U.S. Cl. ........................ 525/193; 525/211; 525/194; 525/232; 525/240
[58] Field of Search ........................ 525/211, 193, 525/194, 232, 240

[56] References Cited

U.S. PATENT DOCUMENTS

| Re. 32,028 | 11/1985 | Fischer et al. | 525/194 |
| 3,758,643 | 9/1973 | Fischer et al. | 525/240 |
| 3,926,900 | 12/1975 | Gizy et al. | 525/211 |
| 4,247,661 | 1/1981 | Herman et al. | 525/95 |
| 4,311,628 | 1/1982 | Abdou-Sabet et al. | 525/232 |
| 4,985,502 | 1/1991 | Izumi et al. | 525/194 |

*Primary Examiner*—Irina S. Zemel
*Attorney, Agent, or Firm*—Seidel, Gonda, Lavorgna & Monaco, PC

[57] ABSTRACT

A thermoplastic elastomeric composition, which comprises liquid 1,2-polybutadiene, EPDM rubber, a polyolefin resin, a curative system consisting of phenolic resin and peroxide, and a co-curing agent, the 1,2-polybutadiene and EPDM rubber being at least partially cured, shows well-balanced various properties including physical properties, elasticity and thermal resistance in addition to being superior in oil resistance at high temperatures and processability.

25 Claims, No Drawings

5,714,545

THERMOPLASTIC ELASTOMERIC COMPOSITION AND PROCESS FOR PREPARING THE SAME

BACKGROUND OF THE INVENTION

1. Field of the invention

The present invention relates to a thermoplastic elastomeric composition and to a process for preparing the same. More particularly, the present invention is concerned with a thermoplastic elastomeric composition comprising liquid 1,2-polybutadiene, ethylene-propylene-diene (EPDM) rubber and polyolefin resin, which has well-balanced various properties including physical properties, elasticity and thermal resistance in addition to being superior in oil resistance at a high temperature and processability, and with processes for preparing the same.

2. Description of the Prior Art

Thermoplastic elastomers, which show the mixed properties of plastic and rubber, are used mainly as rubber-substituting substances for automobile parts. To be automobile parts, polymers are required to have a balance between compression set and mechanical properties and processability, especially, superior thermal resistance and oil resistance.

Many prior techniques have been suggested to develop polymers with such properties. U.S. Pat. Nos. 3,758,643, 3,806,558 and 3,662,106 disclose dynamic curing processes in which blends comprising polyolefin resin and EPDM rubber are partially cured by crosslinking the rubber components with peroxide curative. The compositions prepared by such processes are further processable and present good surfaces to the final articles.

U.S. Pat. No. 4,212,787 suggests a dynamic thermal treatment by which a composition consisting of polyisobutylene inactive to peroxide is partially cured, thereby improving flexibility, elasticity and processability.

European. Pat. No. 0 338 880 discloses use of a crosslinking agent, peroxide in combination with a co-agent, N,N'-m-phenylenebismaleimide, in dynamic thermal treatment of a composition comprising a blend of mineral oil-containing EPDM rubber and polyolefin resin. This patent asserts that it can not only obtain a composition superior in injection moldability and appearance, but can also save much time.

The above-cited patents are concerned with thermoplastic elastomeric compositions with good processability, in which the rubber phases are partially cured by using peroxide curative. However, the conventional thermoplastic elastomeric compositions exhibit low tensile strength and high compression set. A particular problem is that the conventional compositions are vulnerable to heat and oil and thereby, limited in use as automobile parts.

The prior art also discloses fully curing of the rubber phase constituting a thermoplastic elastomeric composition, as disclosed in U.S. Pat. Nos. 4,130,535 and 4,311,628. U.S. Pat. No. 4,130,535 has addressed that EPDM rubber is fully cured by sulfur curative, to obtain a composition with excellent mechanical properties. However, sulfur emits an offensive odor and the composition shows insufficient thermal resistance and oil resistance at high temperatures.

U.S. Pat. No. 4,311,628 discloses the use of phenolic curative along with cure activator to fully cure EPDM rubber. The resulting thermoplastic elastomeric composition is superior in elasticity and mechanical properties and is significantly improved in oil resistance at high temperatures but still shows insufficient oil resistance. In addition, its poor fluidity stigmatizes its injection articles with flow mark. Further, the articles are difficult to color with white because the phenolic curative acts as a strong discoloring agent.

SUMMARY OF THE INVENTION

For solving the aforementioned problems, the present inventors have recognized that there exists a need for a thermoplastic elastomeric composition that retains balanced mechanical properties including elasticity and thermal resistance and shows excellent processability and oil resistance at high temperatures.

As a result of intensive and thorough research by the present inventors, it has been found that liquid 1,2-polybutadiene imparts far superior oil resistance at high temperatures to the resulting composition, and a combination of phenolic curative and peroxide curative not only improves processability but also brings synergistic effects into oil resistance, tensile strength retention and elongation retention.

Accordingly, it is a principal object of the present invention to provide a thermoplastic elastomeric composition far superior in processability and oil resistance at high temperatures, and having well balanced mechanical properties, wherein the rubber phase is at least partially cured with a curative system consisting of phenolic resin and peroxide in combination with a co-curing agent such that synergistic effects can be brought into oil resistance, tensile strength retention and elongation retention.

It is another object of the present invention to provide a process for preparing such a thermoplastic elastomeric composition.

Additional objects, advantages and novel features of the invention will be set forth in part in the description which follows, and in part will become apparent to those skilled in the art upon examination of the following specification or may be learned by practice of this invention.

To achieve the foregoing and other objects in accordance with the present invention, as embodied and broadly described herein, the thermoplastic elastomeric composition comprises liquid 1,2-polybutadiene, EPDM rubber, a polyolefin resin, a curative system consisting of phenolic resin and peroxide, and a co-curing agent wherein the 1,2-polybutadiene and EPDM rubber is at least partially cured.

More particularly, the present invention relates to a thermoplastic elastomeric composition comprising (a) about 2 to 40 parts by weight of liquid 1,2-polybutadiene; (b) about 60 to 98 parts by weight of EPDM rubber; (c) about 10 to 90 parts by weight of a polyolefin resin, based on 100 total parts by weight of the 1,2-polybutadiene and EPDM rubber; (d) about 1.05 to 8 parts by weight of a curative system consisting of about 1 to 5 parts by weight of a phenolic curative and about 0.05 to 3 parts by weight of a peroxide curative, based on 100 total parts by weight of the 1,2-polybutadiene and EPDM rubber; and (e) about 0.5 to 5 parts by weight of a co-curing agent, based on 100 total parts by weight of the 1,2-polybutadiene and EPDM rubber, said 1,2-butadiene and EPDM rubber being at least partially cured.

In a more preferable composition, about 5–20 parts by weight 1,2-polybutadiene, about 80–95 parts by weight EPDM rubber and about 20–85 parts by weight of polyolefin resin per 100 total parts by weight of the 1,2-polybutadiene and EPDM rubber are contained.

In accordance with an aspect of the present invention, the thermoplastic elastomer composition is prepared by (a)

kneading about 2 to 40 parts by weight liquid 1,2-polybutadiene, about 60 to 98 parts by weight EPDM rubber and about 10 to 90 parts by weight of polyolefin resin based on 100 total parts by weight of 1,2-polybutadiene and EPDM rubber with about 0.5 to 5 parts by weight of co-curing agent based on 100 total parts by weight of 1,2-polybutadiene and EPDM rubber in a mixer such as roll mixer, Banbury mixer, continuous mixer or Brabender mixer at a temperature range of about 170° to 250° C. for a period of 5 to 8 min., to produce a pellet type masterbatch; (b) adding about 1 to 5 parts by weight of a phenolic resin based on 100 total parts by weight of 1,2-polybutadiene and EPDM rubber to the masterbatch while mixing at a rotor speed of 80 to 100 rpm in a Brabender mixer with a temperature maintained at about 170° to 250° C. for 3 to 4 min. to partially cure the 1,2-polybutadiene and EPDM rubber; and (C) adding about 0.05 to 3 parts by weight of peroxide curative based on 100 total parts by weight of the 1,2-polybutadiene and EPDM rubber when the mixer torque reaches consistency, to advance the curing of the 1,2-polybutadiene and EPDM rubber, after which the mixture is further mixed with a processing aid and an antioxidant for additional 2 to 3 min.

In accordance with another aspect of the present invention, the thermoplastic elastomer composition is prepared by (A) kneading about 2 to 40 parts by weight liquid 1,2-polybutadiene, about 60 to 98 parts by weight EPDM rubber and about 10 to 90 parts by Weight of polyolefin resin based on 100 total parts by weight of the 1,2-polybutadiene and EPDM rubber with about 0.5 to 5 parts by weight of co-curing agent based on 100 total parts by weight of the 1,2-polybutadiene and EPDM rubber in a mixer such as roll mixer, Banbury mixer, continuous mixer or Brabender mixer at a temperature range of about 170° to 250° C. for a period of 5 to 8 min., to produce a pellet type masterbatch; (B) mixing and melting the masterbatch in a Brabender mixer with a temperature maintained at about 170° to 250° C. for 3 to 4 min. at a rotor speed of 80 to 100 rpm; and (C) simultaneously adding, when the mixer torque reaches consistency, about 1 to 5 parts by weight of phenolic resin based on 100 total parts by weight of the 1,2-polybutadiene and EPDM rubber and about 0.05 to 3 parts by weight of a peroxide curative based on 100 total parts by weight of the 1,2-polybutadiene and EPDM rubber, to advance the curing for 4 to 5 min., after which the mixture is further mixed with a processing aid and an antioxidant for an additional 2 to 3 min.

DETAILED DESCRIPTION OF THE INVENTION

In accordance with the present invention, liquid 1,2-polybutadiene which has a molecular weight of about 1,000 to 7,000 and wherein the liquid 1,2-polybutadiene is a polymer including a plurality of monomer units of which at least 70% of the monomer units are 1,2-vinyl units, is used as a base component of the thermoplastic elastomeric composition, with the aim of exceptionally improving oil resistance at high temperatures. More preferred is 1,2-polybutadiene consisting of at least 85% 1,2-vinyl monomer units and having a molecular weight of about 1,500 to 3,500. For example, if liquid 1,2-polybutadiene with a too small molecular weight is used, mechanical strength is lowered. On the other hand, if the liquid 1,2-polybutadiene has too large molecular weight, the compatibility with EPDM rubber becomes poor. Particularly, solid 1,2-polybutadiene having a large molecular weight, although showing good mechanical properties, imparts too high a hardness to the resulting composition, so as to reduce flexibility and elongation, in addition to being poor in compatibility with EPDM rubber.

The EPDM rubber, which is a major component of the base system in the composition, is at least partially cured by a curing system. For the EPDM rubber, a random copolymer of at least two monoolefins is employed. Representative is an ethylene-propylene-diene tercopolymer consisting mainly of ethylene and propylene. The diene component in this tercopolymer includes dicyclopentadiene, 1,4-hexadiene, cyclooctadiene, methylenenorbornene, ethylidenenorbornene, prophenylnorbonene, cyclohexadiene and the like. Among them, ethylene-propylene-ethylidenenorbornene is most preferable.

As the polyolefin resin, a homopolymer of ethylene or propylene, or a copolymer of propylene with an alpha-olefin such as ethylene, 1-butene, 1-hexene and 4-methyl-1-pentene, is used. Most preferred is crystalline propylene homopolymer which desirably has a melt flow index (MFR) of about 0.3 to 40 g/10 min., when measuring at 230° C. under a load of 2.16 kg, and more desirably about 0.5 to 20 g/min.

To cure the EPDM rubber, a curing system consisting of a combination of a phenolic resin and peroxide is used in accordance with the present invention. Phenolic resins are known as curatives to crosslink EPDM rubber and butyl rubber. Commercially available are dimethylol phenolic resins and halogenated dimethyl phenolic resins.

In the invention, halogenated phenolic resin is used and its amount preferably ranges from about 1 to 5 parts by weight per 100 total parts by weight of the 1,2-polybutadiene and EPDM rubber. For example, if the halogenated phenolic resin exceeds the upper limit, the resulting composition is discolored into yellow or yellowish brown, with degradation of fluidity.

To avoid such problems, peroxide curative is additionally used, according to the present invention. Concrete examples of peroxide curative include benzoyl peroxide, p-chloro benzoyl peroxide, octanoyl peroxide, tert-butyl peroxide, 2,4-dichlorobenzoyl peroxide, cyclohexanone peroxide, t-butylperoxy benzoate, methylethyl ketone peroxide, dicumyl peroxide, di-t-butyl peroxide, 2,5-dimethyl-2,5-di(benzoylperoxy)hexane,2,5-dimethyl-2,5-di(t-butylperoxy) hexane, 2,5-dimethyl-2,5-di(t-butylperoxy)hexane- 3, 1,3-bis(t-butylperoxy isopropyl)benzene, 1,3-bis(t-butylperoxy)--3,5,5-trimethyl cyclohexane, 1,1-bis(t-butylperoxy) cyclohexane, t-butyl perbenzoate, and lauryl peroxide. Among them, 1,3-bis(t-butylperoxy isopropyl)benzene is most preferable. The peroxide curative is used preferably at an amount of about 0.05 to 3 parts by weight, based on 100 total parts by weight of 1,2-polybutadiene and EPDM rubber, and more preferably at an amount of about 1 to 2 parts by weight. Excess peroxide curative is likely to form nonuniform gel-like aggregates, which ultimately appear on the surface of the resulting extruded article or injection molded article.

To improve the cure efficiency and inhibit the decomposition reaction of the peroxide curative, a co-curing agent is used in accordance with the present invention. The co-curing agent may be selected from the group consisting of sulfur, ethylene dimethacrylate, polyethylene glycol dimethacrylate, trimethylol propane trimethylmethacrylate, divinylbenzene, diaryl itaconate, triaryl cyanurate, diaryl phthalate, aryl methacrylate, cyclohexyl methacrylate, N,N'-m-phenylene bismaleimide, zinc diacrylate, zinc dimethacrylate and the mixtures thereof. Preferred are zinc diacrylate, zinc dimethacrylate and trimethylol propane trimethylmethacrylate. The co-curing agent is used preferably at an amount of about 0.5 to 5 parts by weight, based on 100 total parts by weight of 1,2-polybutadiene and EPDM rubber, and more preferably at an amount of about 1 to 3 parts by weight of 1,2-polybutadiene and EPDM rubber.

Addition of various additives conventionally used for rubber formulation and polymer processing may alter the physical properties of thermoplastic elastomer composition of the present invention. Such additives include mineral oil, inorganic fillers, processing aid, wax, colorants, plasticizers, carbon black, antioxidants, and UV stabilizers.

In the case of inorganic fillers and mineral oil, it is most preferable to mix them enough to disperse well, prior to adding the curatives. Inorganic fillers useful for the composition of the present invention are exemplified by talc, clay and barium sulfate, the amount of which may be on the order of about 10 to 250 parts by weight, based on 100 total parts by weight of 1,2-polybutadiene and EPDM rubber. Mineral oils are generally subgrouped into paraffinic, naphthenic and aromatic oils, according to their components. Preference is given to paraffinic oil. The quantity of mineral oil should be within such a range that it is not eluted. Typically, about 20 to 200 parts by weight mineral oil are added per 100 parts by weight EPDM rubber. Ordinary about 50 to 170 parts by weight mineral oil are added per 100 parts by weight EPDM rubber present in the composition, with amounts of about 100 to 150 parts by weight of mineral oil being preferred. A processing aid useful for the composition of the present invention is exemplified by polyethylene wax, the amount of which may be on the order of about 0 to 5 parts by weight, based on 100 parts by weight of EPDM rubber. An antioxidant is added at an amount raging from 0 to 5 parts by weight per 100 parts by weight of EPDM rubber.

For preparing the thermoplastic elastomer composition in accordance with an aspect of the present invention, first, about 2 to 40 parts by weight liquid 1,2-polybutadiene, about 60 to 98 parts by weight EPDM rubber and about 10 to 90 parts by weight of polyolefin resin based on 100 total parts by weight of 1,2-polybutadiene and EPDM rubber are masticated with about 0.5 to 5 parts by weight of a co-curing agent based on 100 total parts by weight of 1,2-polybutadiene and EPDM rubber in a mixer such as roll mixer, Banbury mixer, continuous mixer or Brabender mixer at a temperature range of about 170° to 250° C. for 5 to 8 min., to produce a pellet type masterbatch. To the masterbatch, about 1 to 5 parts by weight of phenolic resin is added while mixing at a rotor speed of 80 to 100 rpm in Brabender mixer for 3 to 4 min., with the aim of partially curing the 1,2-polybutadiene and EPDM rubber. Thereafter, when the mixer has uniform torque, about 0.05 to 3 parts by weight of peroxide curative based on 100 total parts by weight of the 1,2-polybutylene and EPDM rubber is further added, to advance the curing of the 1,2-polybutadiene and EPDM rubber for 3 to 4 min., followed by the mixing of the resulting mixture with a processing aid and an antioxidant for additional 2 to 3 min.

Upon providing the masterbatch, 20 to 200 parts by weight mineral oil per 100 total parts by weight of EPDM rubber may be added.

In another aspect of the present invention, about 2 to 40 parts by weight liquid 1,2-polybutadiene, about 60 to 98 parts by weight EPDM rubber and about 10 to 90 parts by weight of polyolefin resin based on 100 total parts by weight of 1,2-polybutadiene and EPDM rubber are masticated with about 0.5 to 5 parts by weight of a co-curing agent based on 100 total parts by weight of 1,2-polybutadiene and EPDM rubber in a mixer such as roll mixer, Banbury mixer, continuous mixer or Brabender mixer at a temperature range of about 170° to 250° C. for 5 to 8 min., to produce a pellet type masterbatch. After the masterbatch is melted and further masticated in Brabender mixer with a temperature maintained at about 170° to 250° C. at a rotor speed of 80 to 100 rpm for 3 to 4 min., until the mixer comes to have a consistent torque, 1 to 5 parts by weight phenolic resin per 100 total parts by weight of the 1,2-polybutadiene and EPDM rubber, and 0.05 to 3 parts by weight peroxide curative per 100 total parts by weight of the 1,2-polybutadiene and EPDM rubber are added simultaneously to advance the curing of the 1,2-polybutadiene and EPDM rubber for 4 to 5 min., followed by the mixing of the resulting mixture with a processing aid and an antioxidant for additional 2 to 3 min.

Likewise, 20 to 200 parts by weight mineral oil per 100 total parts by weight of the EPDM rubber may be added upon providing the masterbatch.

To test the prepared thermoplastic elastomeric composition for various physical properties, it was subjected to pressing at 200° C. to form into a sheet which was then processed into specimens.

The composition was also extruded through 19 mm diameter Brabender monoaxis extruder (L/D=24) equipped with a tube die (outer diameter 10 mm, inner diameter 8 mm), at 80 rpm at 215° C. The extruded articles were observed for extrusion processability and surface property, that is, smoothness of surface and presence or absence of gel-like aggregates. At that moment, the torque of the extruder and the surface of the extruded articles were observed every meter and evaluated in accordance with the following standards.

Standards for Surface Assay

⊙: smooth and no gel aggregate o: smooth but a few gel aggregates (1 to 3 per meter)

Δ: a little rough and a considerable number of gel aggregates (4 to 10 per meter)

X: very rough and a plenty of gel aggregate (more than 10 per meter)

Following are physical properties and test methods therefor.

1. Tensile strength and Elongation: JIS K-6301

2. Hardness: JIS K-6301

3. Tension set: JIS K-6301

4. Thermal Resistance: JIS K-6301 (150±2° C. for 168 hrs.)

5. Oil Resistance: JIS (125±2° C. for 168 hrs., ASTM #3 oil)

The ingredients used in the present invention are listed along with their properties as follows:

1,2-polybutadiene I: 1,2-vinyl units 85%; molecular weight, 2800±200 (liquid); viscosity, 600 poise (measured at 45° C. by Brookfield viscometer)

1,2-polybutadiene II: 1,2-vinyl units 90%; molecular weight, 2800±200 (liquid); viscosity, 2,500 poise (measured at 45° C. by Brookfield viscometer)

EPDM: oil content, 100%; Ethylene-Propylene-Ethylidenenorbornene terpolymer with an ethylene/propylene ratio of 70/30; ML, 1+4(100° C.)=53; Iodide value=10

Polypropylene; Crystalline propylene homopolymer; MFR, 1.5 g/10 min. (at 230° C. under a load of 2.16 kg)

Phenolic Resin: SP-1055 (tradename, commercially available from Schenectady Chemical Company, U.S.A.): Bromomethylalkyl phenolformaldehyde resin Peroxide: Perkadox-14 (tradename, commercially available from Akzo Chemical Company): 1,3-bis(t-butylperoxy isopropyl)benzene Co-curing agent:
1) TRIM/S (tradename, commercially available from Rhein Chimie, Bayer Company): powder consisting of 70% trimethylol propane trimethacrylate and 30% silica
2) Saret 633 (or 634) (tradename, commercially available from Sartomer Company): zinc diacrylate or zinc dimethacrylate Mineral Oil: D-1900 (tradename, commercially available from Michang Petroleum, Korea): paraffinic white oil Zinc oxide: KS-1 (commercially available from Hanil Zinc Chemical, Korea)

Talc: PNA-400 (commercially available from Ilsin Talc, Korea)

Antioxidant: 21B (commercially available from Songwon Industry, Korea)

Processing aid: 102N (commercially available from Lion Chemical, Korea): polyethylene wax A better understanding of the present invention may be obtained in light of following examples which are set forth to illustrate, but are not to be construed to limit, the present invention.

COMPARATIVE EXAMPLE I 5 parts by weight of liquid 1,2-PB I, 190 parts by weight of EPDM (100% oil-extended) rubber, 50 parts by weight of polypropylene resin, and 2 parts by weight of zinc oxide were homogeneously masticated for 8 min. in a Banbury mixer with a temperature adjusted into 100° C. until the temperature reached 215° C. and, then, passed through a short extruder to produce a pellet type masterbatch. Thereafter, the masterbatch was melted at 175° C. in a Brabender mixer while kneading at 100 rpm for 3 min. After the torque became uniform, 1,2-PB I and EPDM rubber were subjected to a dynamic curing reaction for 3 min. by addition of 12 parts by weight of phenolic resin per 100 total parts by weight of 1,2-PB I and pure EPDM rubber, followed by the addition of polyethylene wax and an antioxidant and by additional kneading for 2 min.

The thermoplastic elastomer thus obtained was tested for various physical properties, extrusion processability and surface appearance of extruded articles and the results are given as shown in Table I below.

COMPARATIVE EXAMPLE II

Comparative Example I was repeated except using about 2.5 parts by weight of Saret 633, a co-curing agent, without zinc oxide, upon preparing the masterbatch in the Banbury mixer and about 1.5 parts by weight of a peroxide curative instead of the phenolic curative. The results of the tests are given as shown in Table I below.

COMPARATIVE EXAMPLE III

Comparative Example I was repeated except using 200 parts by weight of EPDM (100% oil-extended) rubber without 1,2-PB I.

The results of the test are given as shown in Table I below.

COMPARATIVE EXAMPLE IV

Comparative Example II was repeated except using 200 parts by weight of EPDM (100% oil-extended) rubber without 1,2-PB I.

The results of the test are given as shown in Table I below.

EXAMPLE I

A masterbatch was prepared in the same manner as that of Comparative Example II. The masterbatch was homogeneously mixed with 5 parts by weight of phenolic resin per 100 parts by weight of 1,2-PB I and pure EPDM rubber and the resulting mixture was subjected to a dynamic curing reaction while kneading for 4 min. under the same condition as that of Comparative Example I, so as to partially cure the 1,2-PB I and EPDM rubber. After undergoing the curing reaction for 3 min. by adding peroxide in such an amount as indicated in Table I, an antioxidant and polyethylene wax were added to the mixture, which was additionally kneaded for 2 min.

The results of the tests of the composition obtained, are given as shown in Table I below.

COMPARATIVE EXAMPLE V

Example I was repeated except using 200 parts by weight of EPDM (100% oil-extended) rubber without 1,2-PB I.

The results of the test are given as shown in Table I below.

TABLE I

| Composition | Example I | C. Example I | C. Example II | C. Example III | C. Example IV | C. Example V |
|---|---|---|---|---|---|---|
| Masterbatch | | | | | | |
| 1,2-PBI | 5 | 5 | 5 | — | — | — |
| EPDM (100% oil) | 190 | 190 | 190 | 200 | 200 | 200 |
| Polypropylene | 50 | 50 | 50 | 50 | 50 | 50 |
| Zinc oxide | — | 2 | — | 2 | — | — |
| Saret 633 (Co-curing agent) | 2.5 | — | 2.5 | — | 2.5 | 2.5 |
| SP-1055 (Phenolic Resin) | 5 | 12 | — | 12 | — | 5 |
| Peroxide | 1.0 | — | 1.5 | — | 1.5 | 1.0 |
| Polyethylene wax | 4 | 4 | 4 | 4 | 4 | 4 |
| Antioxidant | 2.5 | 2.5 | 2.5 | 2.5 | 2.5 | 2.5 |
| Physical Properties | | | | | | |
| Tens. Strength (kg/cm$^2$) | 85 | 84 | 59 | 88 | 61 | 86 |
| Elongation (%) | 415 | 405 | 480 | 430 | 495 | 427 |
| 100% Mod. (kg/cm$^2$) | 28 | 29 | 27 | 27 | 26 | 27 |
| Hardness (JIS A), 5 sec. | 66 | 67 | 60 | 65 | 62 | 63 |
| Tension set (%) | 9 | 9 | 17 | 7 | 18 | 9 |
| Thermal Resistance (150° C. × 168 hrs.) | | | | | | |
| Tensile Retention (%) | 99 | 97 | 80 | 102 | 81 | 98 |
| Elong. Retention (%) | 80 | 82 | 64 | 82 | 67 | 82 |
| Oil Resistance (125° C. × 168 hrs. @ ASTM #3 Oil) | | | | | | |
| Tensile Retention (%) | 76 | 56 | 45 | 55 | 42 | 60 |
| Elong. Retention (%) | 64 | 45 | 38 | 44 | 36 | 44 |
| Volume swell (%) | 78 | 82 | 131 | 98 | 158 | 105 |
| Processability | | | | | | |
| Surface Appearance of extruded article | ⊚ | Δ | ○ | X | ○ | ○ |
| Torque of Extruder (NM) | 30.5 | 46.5 | 28.9 | 49.7 | 32 | 35.0 |

As apparent from Table 1, the addition of liquid 1,2-poly butadiene can significantly improve the oil swell percentage of the thermoplastic elastomeric composition prepared with phenolic resin or peroxide curative or the combinations thereof. Particularly, the use of a combination of phenolic resin and peroxide curative (Example I) exhibits unexpected, synergistic effects on the 1,2-polybutadiene-containing composition such that tensile retention and elongation retention both are far more improved than when phenolic resin or peroxide curative is used alone. Phenolic resin alone can bring about a considerable improvement in physical properties, irrespective of the use of 1,2-PB but a significant degradation in processability. Peroxide alone has difficulty in controlling gel aggregates.

EXAMPLE II

Example I was repeated except using 2.5 parts by weight of 1,2-PB I and 195 parts by weight of EPDM (100% oil-extended) rubber.

The results of the test are given as shown in Table II below.

EXAMPLE III

Example I was repeated except using 10 parts by weight of 1,2-PB I and 180 parts by weight of EPDM (100% oil-extended) rubber.

The results of the test are given as shown in Table II below.

EXAMPLE IV

Example I was repeated except using 20 parts by weight of 1,2-PB I and 160 parts by weight of EPDM (100% oil-extended) rubber.

The results of the test are given as shown in Table II below.

EXAMPLE V

Example I was repeated except using 30 parts by weight of 1,2-PB I and 140 parts by weight of EPDM (100% oil-extended) rubber.

The results of the test are given as shown in Table II below.

TABLE II

| Composition | Example II | Example III | Example IV | Example V |
|---|---|---|---|---|
| Masterbatch | | | | |
| 1,2-PBI | 2.5 | 10 | 20 | 30 |
| EPDM (100% oil) | 195 | 180 | 160 | 140 |
| Polypropylene | 50 | 50 | 50 | 50 |
| Saret 633 (Co-curing agent) | 2.5 | 2.5 | 2.5 | 2.5 |
| SP-1055 | 5 | 5 | 5 | 5 |
| Peroxide | 1.0 | 1.0 | 1.0 | 1.0 |
| Polyethylene wax | 4 | 4 | 4 | 4 |
| Antioxidant | 2.5 | 2.5 | 2.5 | 2.5 |
| Physical Properties | | | | |
| Tens. Strength (kg/cm$^2$) | 81 | 89 | 87 | 78 |
| Elongation (%) | 425 | 403 | 395 | 380 |
| 100% Mod. (kg/cm$^2$) | 27 | 28 | 29 | 27 |
| Hardness (JIS A), 5 sec. | 65 | 67 | 68 | 64 |
| Tension set (%) | 10 | 9 | 10 | 12 |
| Thermal Resistance (150° C. × 168 hrs.) | | | | |
| Tens. Retention (%) | 98 | 98 | 96 | 85 |
| Elong. Retention (%) | 82 | 83 | 75 | 71 |
| Oil Resistance (125° C. × 168 hrs. @ ASTM #3 Oil) | | | | |
| Tens. Retention (%) | 72 | 76 | 75 | 70 |
| Elong. Retention (%) | 60 | 64 | 64 | 57 |
| Volume swell (%) | 85 | 75 | 73 | 78 |
| Processability | | | | |
| Surface Appearance of extruded article | ○ | ◉ | ◉ | ◉ |
| Torque of Extruder (NM) | 34.2 | 31.0 | 29 | 24 |

Comparing Table II with the column of Comparative Example V of Table I, 1,2-PB, even though small amount, can markedly improve the oil resistance at a high temperature. In addition, Table II demonstrates that the oil swell percentage and the processability are improved with the increase of 1,2-PB content. However, it is anticipated that excess 1,2-PB deleteriously affects the mechanical properties.

EXAMPLE VI

Example I was repeated except using 10 parts by weight of 1,2-PB II, Saret 634, 40 parts by weight of paraffinic oil per 100 parts by pure EPDM rubber and 40 parts by weight of talc upon preparing the masterbatch in the Banbury mixer.

The results of the tests are given as shown in Table III below.

EXAMPLE VII

Example VI was repeated except adding 17 parts by weight of polypropylene, along with the masterbatch and the phenolic resin, in the Brabender mixer.

The results of the tests are given as shown in Table III below.

EXAMPLE VIII

Example VI was repeated except adding 50 parts by weight of polypropylene, along with the masterbatch and the phenolic resin, in the Brabender mixer.

The results of the tests are given as shown in Table III below.

EXAMPLE IX

Example VI was repeated except adding 100 parts by weight of polypropylene, along with the masterbatch and the phenolic resin, in the Brabender mixer.

The results of the tests are given as shown in Table III below.

EXAMPLE X

Example VI was repeated except adding 183 parts by weight of polypropylene, along with the masterbatch and the phenolic resin, in the Brabender mixer.

The results of the tests are given as shown in Table III below.

COMPARATIVE EXAMPLE VI 200 parts by weight of EPDM (100% oil-extended) rubber, 50 parts by weight of polypropylene resin, 40 parts by weight of talc, and 40 parts by weight of paraffinic oil per 100 parts by weight of pure EPDM rubber all were homogeneously masticated for 8 min. in a Banbury mixer with the temperature adjusted to 100° C., until the temperature reached 215° C. and, then, passed through a short extruder to produce a pellet type masterbatch. Thereafter, the masterbatch was melted at 175° C. in a Brabender mixer while kneading at 100 rpm for 3 min. After the torque became uniform, the resulting mixture was added to a phenolic resin, kneaded for additional 2 min. and reacted with zinc oxide, to be fully cured for 4 min.

Prior to the test for various physical properties and extrusion processability, polyethylene wax and an antioxidant were added and masticated for 2 min.

The results of the test are given as shown in Table III below.

COMPARATIVE EXAMPLE VII

Comparative Example VI was repeated except adding 17 parts by weight of polypropylene, along with the masterbatch, in the Brabender mixer.

The results of the tests are given as shown in Table III below.

COMPARATIVE EXAMPLE VIII

Comparative Example VI was repeated except adding 50 parts by weight of polypropylene, along with the masterbatch, in the Brabender mixer.

The results of the tests are given as shown in Table III below.

TABLE III

| Composition | Example VI | VII | VIII | IX | X | C. Example VI | VII | VIII |
|---|---|---|---|---|---|---|---|---|
| Masterbatch | | | | | | | | |
| 1,2-PBII | 10 | 10 | 10 | 10 | 10 | — | — | — |
| EPDM (100% oil) | 180 | 180 | 180 | 180 | 180 | 200 | 200 | 200 |
| Paraffinic oil | 36 | 36 | 36 | 36 | 36 | 40 | 40 | 40 |
| Polypropylene | 50 | 50 | 50 | 50 | 50 | 50 | 50 | 50 |
| Inorganic Filler (talc) | 40 | 40 | 40 | 40 | 40 | 40 | 40 | 40 |
| Saret 634 (Co-curing agent) | 2.5 | 2.5 | 2.5 | 2.5 | 2.5 | — | — | — |
| Polypropylene | — | 17 | 50 | 100 | 183 | — | 17 | 50 |
| SP-1055 | 4 | 4 | 4 | 4 | 4 | 12 | 12 | 12 |
| Peroxide | 1.5 | 1.5 | 1.5 | 1.5 | 1.5 | — | — | — |
| Zinc oxide | — | — | — | — | — | 2.3 | 2.3 | 2.3 |
| Polyethylene wax | 3 | 3 | 3 | 3 | 3 | 3 | 3 | 3 |
| Antioxidant | 2.5 | 2.6 | 3.0 | 3.5 | 4.3 | 2.5 | 2.6 | 3.0 |
| Physical Properties | | | | | | | | |
| Tens. Strength (kg/cm$^2$) | 82 | 95 | 118 | 174 | 197 | 78 | 87 | 112 |
| Elongation (%) | 395 | 440 | 465 | 574 | 584 | 402 | 490 | 543 |
| 100% Mod. (kg/cm$^2$) | 26 | 36 | 48 | 73 | 92 | 25 | 35 | 46 |
| Hardness (JIS A), 5 sec. | 63 | 74 | 83 | 91 | 94 | 65 | 75 | 83 |
| Tension set (%) | 8.5 | 13 | 19 | 31 | 45 | 10 | 13 | 18 |
| Thermal Resistance (150° C. × 168 hrs.) | | | | | | | | |
| Tens. Retention (%) | 98 | 98 | 92 | 90 | 81 | 92 | 95 | 92 |
| Elong. Retention (%) | 85 | 81 | 75 | 68 | 62 | 86 | 82 | 75 |
| Oil Resistance (125° C. × 168 hrs. @ ASTM #3 Oil) | | | | | | | | |
| Tens. Retention (%) | 76 | 77 | 75 | 75 | 77 | 52 | 48 | 47 |
| Elong. Retention (%) | 64 | 65 | 61 | 63 | 63 | 43 | 37 | 39 |
| Volume swell (%) | 76 | 64 | 56 | 49 | 40 | 106 | 95 | 82 |
| Processability | | | | | | | | |
| Surface Appearance of extruded article | ◎ | ◎ | ◎ | ◎ | ◎ | X | ○ | ◎ |
| Torque of Extruder (NM) | 33 | 29.7 | 26.7 | 25.2 | 24 | 47 | 42.5 | 36 |

As shown in table III, the thermoplastic elastomer composition of this invention containing 1,2-PB and the combined curative comprising phenolic resin and peroxide has more excellent oil resistance at a high temperature and processability than EPDM/PP thermoplastic elastomeric compositions dynamically cured only by phenolic curative comprising phenolic resin and ZnO.

EXAMPLE XI 5 parts by weight of liquid 1,2-PB II, 190 parts by weight of polypropylene resin, 40 parts by weight of talc, 40 parts by weight of paraffinic oil per 100 parts by weight of pure EPDM rubber and a co-curing agent (Saret 633) all were homogeneously masticated for 8 min. in a Banbury mixer with a temperature adjusted into 100° C., until the temperature reached 215° C. and the homogenous mixture was passed through a short extruder to give a pellet type masterbatch. Thereafter, the masterbatch was added to a phenolic resin at such amounts as indicated in Table IV, and subjected to curing reaction at 175° C. in a Brabender mixer while kneading at 100 rpm for 4 min. After the torque became uniform, 1,2-PB II and EPDM rubber were further subjected to a dynamic curing reaction for 3 min. by addition of peroxide, followed by the addition of polyethylene wax and an antioxidant.

The thermoplastic elastomer thus obtained was tested for various physical properties, extrusion processability and surface appearance of extruded article, and the results are given as shown in Table IV below.

EXAMPLE XII

The masterbatch prepared in Example XI was kneaded for 4 min. in a Brabender mixer. After the torque became uniform, 1,2-PB II and EPDM rubber were subjected to a dynamic curing reaction for 3 min. by addition of phenolic resin and peroxide, followed by addition of polyethylene wax and an antioxidant, and by additional kneading for 2 min.

The results of the test are given as shown in Table IV below.

EXAMPLE XIII

The masterbatch was prepared in the same manner as Example XI except excluding a co-curing agent (Saret 633). The above masterbatch was added with phenolic resin, and then kneaded and dynamically cured for 4 min. in a Brabender mixer.

The resulting mixture was added with peroxide curative and Saret 633 at the same time and subjected to curing reaction for 4 min.

The results of the test are given as shown in Table IV below.

TABLE IV

| | Example | | |
|---|---|---|---|
| Composition | XI | XII | XIII |
| Masterbatch | | | |
| 1,2-PBII | 5 | 5 | 5 |
| EPDM (100% oil) | 190 | 190 | 190 |
| Talc | 40 | 40 | 40 |
| Paraffinic oil | 38 | 38 | 38 |
| Polypropylene | 50 | 50 | 50 |
| Saret 633 | 2.5 | 2.5 | — |
| SP-1055 | 5 | — | 5 |
| SP-1055/Peroxide | — | 5/1.5 | — |
| Peroxide/Saret 633 | 1.5/— | — | 1.5/2.5 |
| Polyethylene wax | 4 | 4 | 4 |
| Antioxidant | 2.5 | 2.5 | 2.5 |
| Physical Properties | | | |
| Tensile Strength (kg/cm²) | 82 | 78 | many gel |
| Elongation (%) | 398 | 412 | aggregates |
| 100% Mod. (kg/cm²) | 29 | 28 | with 1 mm |
| Hardness (JIS A), 5 sec. | 66 | 65 | or more |
| Tension set (%) | 8 | 10 | diameter |
| Processability | | | |
| Surface Appearance of extruded article | ⊙ | ⊙ | X |
| Torque of Extruder (NM) | 28 | 30 | — |

Table IV above shows the relation between the properties and the addition time of the curative and co-curing agent. As apparent from this table, it is inappropriate to add peroxide and co-curing agent at the same time. Therefore, a conclusion can be elicited that the co-curing agent should be well dispersed upon dynamic curing.

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A thermoplastic elastomeric composition, comprising:
   (a) about 2 to 40 parts by weight of liquid 1,2-polybutadiene which has a molecular weight of about 1,000 to 7,000 and wherein the liquid 1,2-polybutadiene is a polymer including a plurality of monomer units of which at least 70% of the monomer units are 1,2-vinyl units;
   (b) about 60 to 98 parts by weight of ethylene-propylene-diene rubber;
   (c) about 10 to 90 parts by weight of a polyolefin resin per 100 total parts by weight of the 1,2-polybutadiene and ethylene-propylene-diene rubber;
   (d) about 1.05 to 8 parts by weight of a curative system consisting of about 1 to 5 parts by weight of a phenolic curative and about 0.05 to 3 parts by weight of a peroxide curative, per 100 total parts by weight of the 1,2-polybutadiene and ethylene-propylene-diene rubber; and
   (e) about 0.5 to 5 parts by weight of a co-curing agent per 100 total parts by weight of the 1,2-polybutadiene and ethylene-propylene-diene rubber, said 1,2-polybutadiene and said ethylene-propylene-diene rubber being at least partially dynamically cured at a temperature range of about 170° to 250° C.

2. The thermoplastic elastomeric composition in accordance with claim 1, wherein said 1,2-polybutadiene consists of at least 85% 1,2-vinyl monomer units and has a molecular weight of about 1,500 to 3,500.

3. The thermoplastic elastomeric composition in accordance with claim 1, wherein said ethylene-propylene-diene rubber is ethylene-propylene-ethylidenenorbornene rubber.

4. The thermoplastic elastomeric composition in accordance with claim 1, wherein said polyolefin resin is crystalline polypropylene.

5. The thermoplastic elastomeric composition in accordance with claim 1, wherein said phenolic curative is a halogenated phenolic resin.

6. The thermoplastic elastomeric composition in accordance with claim 1, wherein said peroxide curative is 1,3-bis(t-butylperoxy isopropyl)benzene.

7. The thermoplastic elastomeric composition in accordance with claim 1, wherein said co-curing agent is selected from the group consisting of trimethylol propane trimethyl methacrylate, zinc dimethacrylate and zinc diacrylate.

8. The thermoplastic elastomeric composition in accordance with claim 1, further comprising about 10 to 250 parts by weight of an inorganic filler per 100 total parts by weight of said 1,2-polybutadiene and ethylene-propylene-diene rubber.

9. The thermoplastic elastomeric composition in accordance with claim 8, wherein said inorganic filler is selected from the group consisting of clay, talc and barium sulfate.

10. The thermoplastic elastomeric composition in accordance with claim 1, further comprising about 20 to 200 parts by weight of mineral oil per 100 parts of said ethylene-propylene-diene rubber.

11. The thermoplastic elastomeric composition in accordance with claim 10, wherein said mineral oil is a paraffinic oil.

12. A process for preparing a thermoplastic elastomeric composition, comprising the steps of:
   (a) kneading about 2 to 40 parts by weight of liquid 1,2-polybutadiene, wherein said liquid 1,2-polybutadiene is a polymer including a plurality of monomer units of which at least 70% of the monomer units are 1,2-vinyl units and which 1,2-polybutadiene has a molecular weight of about 1,000 to 7,000, about 60 to 98 parts by weight of ethylene-propylene-diene rubber, about 10 to 90 parts by weight of polyolefin resin per 100 total parts by weight of the 1,2-polybutadiene and ethylene-propylene-diene rubber, and about 0.5 to 5 parts by weight of a co-curing agent per 100 total parts by weight of the 1,2-polybutadiene and ethylene-propylene-diene rubber, in a mixer at a temperature range of about 170° to 250° C. for a period of 5 to 8 minutes, to produce a pellet type masterbatch;

(b) adding about 1 to 5 parts by weight of phenolic resin per 100 total parts by weight of the 1,2-polybutadiene and ethylene-propylene-diene rubber to the masterbatch while mixing at a temperature of about 170° to 250° C., to partially cure the 1,2-polybutadiene and ethylene-propylene-diene rubber; and (c) adding about 0.05 to 3 parts by weight of peroxide curative per 100 total parts by weight of the 1,2-polybutadiene and ethylene-propylene-diene rubber when mixer torque consistency is reached, to advance the curing of the 1,2-polybutadiene and ethylene-propylene-diene rubber, after which the mixture is further mixed with a processing aid and an antioxidant.

13. The process in accordance with claim 12, wherein said 1,2-polybutadiene consists of at least 85% 1,2-vinyl monomer units and has a molecular weight of about 1,500 to 3,500.

14. The process in accordance with claim 12, wherein said ethylene-propylene-diene rubber is ethylene-propylene-ethylidenenorbornene rubber.

15. The process in accordance with claim 12, wherein said polyolefin resin is crystalline polypropylene.

16. The process in accordance with claim 12, wherein said phenolic resin is a halogenated phenolic resin.

17. The process in accordance with claim 12, wherein said peroxide curative is 1,3-bis(t-butylperoxy isopropyl) benzene.

18. The process in accordance with claim 12, wherein said co-curing agent is selected from the group consisting of trimethylol propane trimethyl methacrylate, zinc dimethacrylate and zinc diacrylate.

19. The process in accordance with claim 12, further comprising adding about 10 to 250 parts by weight of an inorganic filler per 100 total parts by weight of said 1,2-polybutadiene and ethylene-propylene-diene rubber.

20. The process in accordance with claim 12, wherein said inorganic filler is selected from the group consisting of clay, talc and barium sulfate.

21. The process in accordance with claim 12, further comprising about 20 to 200 parts by weight of mineral oil per 100 parts of said ethylene-propylene-diene rubber.

22. The process in accordance with claim 21, wherein said mineral oil is a paraffinic oil.

23. A process for preparing a thermoplastic elastomeric composition, comprising the steps of:

(a) kneading about 2 to 40 parts by weight of liquid 1,2-polybutadiene, wherein said liquid 1,2-polybutadiene is a polymer including a plurality of monomer units of which at least 70% of the monomer units are 1,2-vinyl units and which 1,2-polybutadiene has a molecular weight of about 1,000 to 7,000, about 60 to 98 parts by weight of ethylene-propylene-diene rubber, about 10 to 90 parts by weight of polyolefin resin per 100 total parts by weight of the 1,2-polybutadiene and ethylene-propylene-diene rubber, and about 0.5 to 5 parts by weight of a co-curing agent per 100 total parts by weight of the 1,2-polybutadiene and ethylene-propylene-diene rubber, in a mixer at a temperature range of about 170° to 250° C., to produce a pellet type masterbatch;

(b) mixing and melting the masterbatch in a mixer with a temperature maintained at about 170° to 250° C.; and (c) simultaneously adding to the masterbatch, when mixer torque reaches consistency, about 1 to 5 parts by weight of phenolic resin per 100 total parts by weight of the 1,2-polybutadiene and ethylene-propylene-diene rubber and about 0.05 to 3 parts by weight of a peroxide curative per 100 total parts by weight of the 1,2-polybutadiene and ethylene-propylene-diene rubber, after which the mixture is further mixed with a processing aid and an antioxidant.

24. The process in accordance with claim 23, further comprising about 10 to 250 parts by weight of an inorganic filler per 100 total parts by weight of said 1,2-polybutadiene and ethylene-propylene-diene rubber.

25. The process in accordance with claim 23, further comprising about 20 to 200 parts by weight of mineral oil per 100 parts of said ethylene-propylene-diene rubber.

* * * * *